A. BURDICT.
Improvement in Batter-Mixers.

No. 128,013. Patented June 18, 1872.

WITNESSES.
Villette Anderson
Geo. C. Upham

INVENTOR.
Arthur Burdict,
Chipman Hosmer & Co
Attys

UNITED STATES PATENT OFFICE.

ARTHUR BURDICT, OF MIDDLETOWN, CONNECTICUT.

IMPROVEMENT IN BATTER-MIXERS.

Specification forming part of Letters Patent No. 128,013, dated June 18, 1872.

*To all whom it may concern:*

Be it known that I, ARTHUR BURDICT, of Middletown, in the county of Middlesex and State of Connecticut, have invented a new and valuable Improvement in Batter-Spoons; and I do hereby declare that the following is a full, clear, and exact description of the construction and operation of the same, reference being had to the annexed drawing making a part of this specification, and to the letters and figures of reference marked thereon.

Figure 1:
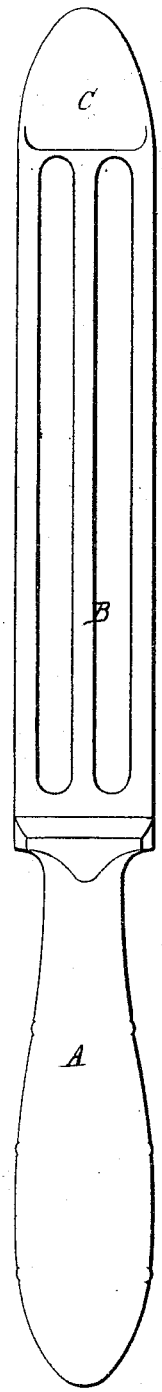
Figure 2:
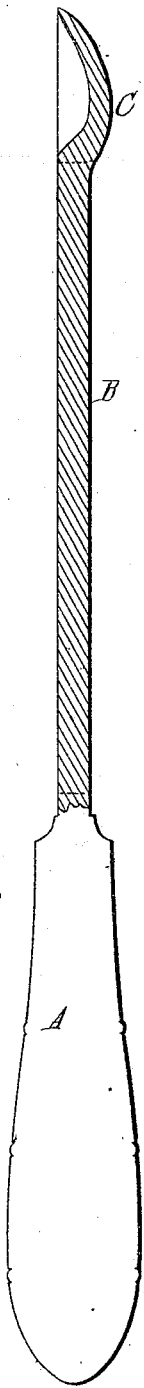

Figure 1 of the drawing is a representation of a plan view of my invention. Fig. 2 is a longitudinal vertical section of the same.

This invention has relation to batter-mixers; and consists in the novel construction of a utensil having combined with a slotted beater for agitating and mixing all kinds of batter a spoon for convenience in tasting to test flavors, &c., substantially as hereinafter described. This utensil should be made of wood.

In the drawing, A represents a rounded handle, next to which is a beater, B, consisting of a slotted flat shank of sufficient size and strength for effective use. The end of this blade is formed into a spoon, C, which may be used for tasting the ingredients or the flavor of any mixture to which the beater is applied. The spoon is also useful and convenient for the purpose of conveying spices, sugar, &c., to the batter, picking out specks, and for many other purposes which its use will suggest.

The advantage of a slotted blade for the mixing of ingredients in batter is obvious.

The utensil may be used with effect as an egg-beater.

The entire instrument may be readily formed of a piece of hard wood.

What I claim as my invention, and desire to secure by Letters Patent, is—

The batter-mixer, consisting of the slotted beater-shank B, spoon C, and handle A combined, substantially as specified.

In testimony that I claim the above I have hereunto subscribed my name in the presence of two witnesses.

ARTHUR BURDICT.

Witnesses:
A. PUTNAM,
MARTIN LOVELAND.